C. A. SEELEY.
Armature for Magneto-Electric Machines.
No. 229,191. Patented June 22, 1880.
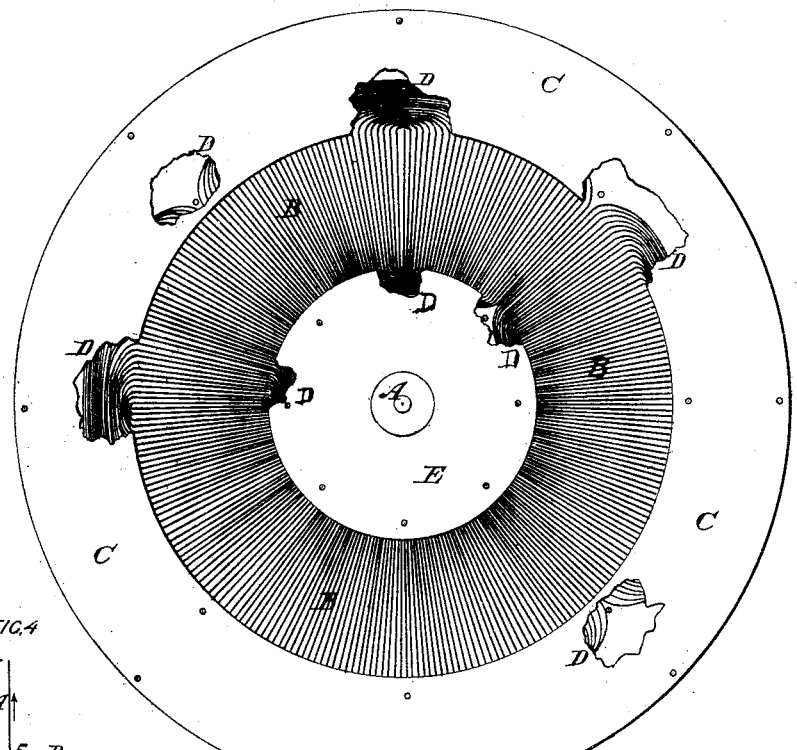
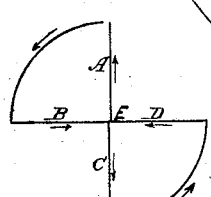
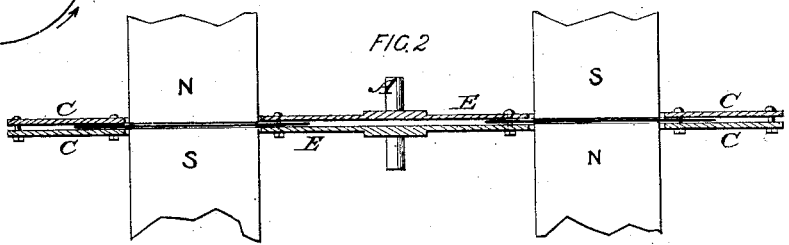
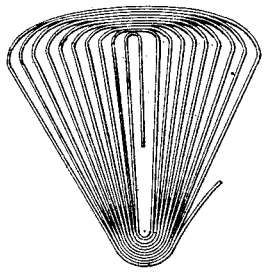
WITNESSES
INVENTOR
Charles A. Seeley

UNITED STATES PATENT OFFICE.

CHARLES A. SEELEY, OF NEW YORK, N. Y.

ARMATURE FOR MAGNETO-ELECTRIC MACHINES.

SPECIFICATION forming part of Letters Patent No. 229,191, dated June 22, 1880.

Application filed September 10, 1879.

*To all whom it may concern:*

Be it known that I, CHARLES A. SEELEY, of the city of New York, have invented a new and useful Improvement in Armatures of Magneto-Electric Machines, of which the following is a specification.

My invention consists in the arrangement of the elements of the armature so that the whole assumes the form of a revolving disk, the whole space of which shall be occupied and filled out by the said elements. In short, it may be considered a modification of what is known as "Arago's disk," whereby the induced currents are rendered utilizable.

In the common form of the disk experiment the induced currents find in the matter of the disk direct paths of reunion, and thus the electricity is almost wholly transformed into heat, while in my disk-armature the currents produced in precisely the same conditions are kept apart and carried away for use. I secure the result by suitably constructing the disk of insulated wire.

In the magneto-electric machine my armature revolves in magnetic fields arranged radially with reference to the axis of the armature.

If a vertical wire be moved in front of a north magnet-pole to the right the induced current tends upward, and if a vertical wire be so moved before a south magnet-pole the induced current tends downward; also, if the wire be moved to the left before the poles the current will tend in reverse directions.

In Fig. 4 a wire is represented as bent so that a large part of its course is on radial lines. Now, if there be placed behind the wire at A and C north magnet-poles and behind B and D south magnet-poles, and then the wire be revolved on its horizontal axis at E in the direction of the hands of a watch, the induced current throughout the whole length of the wire will tend in the direction shown by the arrow until in its revolution the wire comes under the controlling influence of poles of opposite name, when the current will be reversed. In the arrangement shown in Fig. 4 the current will undergo four reversals in the complete revolution, and the changing-points will be half-way between contiguous poles.

It is evident that by increasing the number of magnet-poles and the corresponding radial wire turns, the electric changes will be increased; also, that the amount of electric induction will be increased by increasing the number of wires.

My disk-armature, then, consists essentially of wire wound in radial directions, so that the radii entering on winding may be moved before magnet-poles of the same name, while the radii outgoing move before the opposite poles. It is to be understood that the whole mass of the disk, so far as is practicable, shall be filled out or made up of the radial winding, and that the sectors of out-and-in wires shall be equal in number and symmetrical in form and arrangement.

One of the simple methods of winding is shown in Fig. 3, where the radii at the left are entering and the radii at the right are outgoing. In this case the wire fills out a sector of one-sixth of the circle, and six similar sectors are required for the completion of a disk-armature.

The plan of winding, as shown in Fig. 3, may be carried out, so that any sector of a circle may be filled out or even a complete circle, in which last case one-half of the radii would be ingoing and one-half outgoing.

Another plan of winding is to continue the wire across or beyond the center of the circle, bending the wire away from the center in order to leave place for the axis, and continuing it upon a diameter and returning it upon a new diameter, so on until desired sectors or the whole circle are filled. In this plan the diametrical wires cross each other near the axis.

Figure 1 is a plan view of my armature, and Fig. 2 is a section of the same through its center.

A is the axis; B, the radial part of the winding. D D are parts of the winding other than the radial. E E are circular plates of metal or other suitable material, which serve to bind together in place the inner sides of sectors of wire; and C C are two flat rings, which serve to bind in place the outer sides of sectors.

In Fig. 2, N N S S are four magnet-poles in proper position in relation to the armature. There may be as many pairs of field-magnet poles as there are pairs of sectors of in-and-out radial wires; but as with other armatures, and for similar reasons, the number of pairs of poles may not be equal to the number of pairs of sectors.

The sectors of my armature stand in the same relation to the field-magnets as do the components of other armatures, and are susceptible of many of the well-known modifications of arrangement. The sectors may be considered as having the office of helices of ordinary construction.

It will now be readily understood that my sectors may be connected in series or in multiple arc, and that a commutator of ordinary construction is to be used with them.

None of the plans of connection are shown in the drawings, for the reason that they are well known to those skilled in the art.

In the description thus far the sectors and the completed disk-armature are supposed to be made up of a single layer of wire; but two or more layers may often be used to advantage. The wire circles of two or more single-layer armatures may be united face to face; or sectors may be made having two or more layers of wire, and these be then combined for an armature. In any case the layers may be united in multiple arc or in series. In the place of wire, insulated copper ribbon may be used to advantage, and the width of the ribbon will determine the thickness of the disk.

To secure the required rigidity and strength of my armature, I rely mainly upon the flat binding-rings and the circular plates; but for a further means I fill up the interstices of the radial part of the winding with glue, shellac, or other similar substance; also, braces between the binding-rings and the circular plates may be arranged at the joints of the sectors; also, it is well to cement on the faces of the completed disk stout linen cloth.

The parts of my armature are called "sectors," although they are only approximations to the geometrical form. The variation may be greater than that shown in the drawings.

Whatever be the precise form of the parts each one occupies a sector of the disk.

In my armature I do not consider that iron cores are necessary or desirable for their magnetic effect; but if radial braces are employed it is well that they should be of iron.

It will be observed that it is only that part of the wire of my armature which lies in the radial direction which is efficient in the electro-magnetic induction, while the remainder, which lies circumferentially, serves only as connectors for the radii.

The distinction of "efficient" or "radial" and "connecting" or "curved" are of great assistance to the proper understanding of my invention.

Radial wire only should be comprised within the magnetic field, and the space of the field, so far as is consistent with the free movement of the armature, should be occupied by the efficient wire. The connecting-wire, on the other hand, should lie wholly beyond and without the magnetic field, and should serve as the means, in conjunction with the clamping-rings C C and E E, of giving strength and rigidity to the whole structure.

The armature is to be attached to the axis by means of keys, bolts, or other known devices.

One of the important peculiarities of my disk-armature is the filling out with radial wire the spaces which correspond to the core-spaces of machines of the alliance class and the spaces between contiguous helices.

I do not claim herein a magneto-electric machine with disk-armature when the efficient wire of the latter is comprised within the magnetic field and the connecting-wire lies without the magnetic field, as I shall make such matter the subject of separate application for patent.

I claim—

1. The combination of the binding-ring and binding-circles with the winding of the armature, as described.

2. The disposition of the efficient wire of the disk-armature in radial directions and with uniform spacings with inclined sides, as described.

3. A disk-armature in which the core-spaces and the spaces between contiguous elements are occupied by efficient wire.

CHARLES A. SEELEY.

Witnesses:
 FRANK DIBBEN,
 O. H. HOLBERG.